United States Patent
Cheng et al.

(10) Patent No.: US 8,867,400 B2
(45) Date of Patent: Oct. 21, 2014

(54) METHOD AND APPARATUS FOR TRACKING CLOCK SOURCES

(75) Inventors: Yong Cheng, Shenzhen (CN); Xiaodong Bao, Shenzhen (CN); Zhan Zhang, Shenzhen (CN); Yinghai He, Shenzhen (CN); Ning Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 637 days.

(21) Appl. No.: 12/730,654

(22) Filed: Mar. 24, 2010

(65) Prior Publication Data

US 2010/0177666 A1 Jul. 15, 2010

Related U.S. Application Data

(63) Continuation of application No. PCT/CN2008/072454, filed on Sep. 23, 2008.

(30) Foreign Application Priority Data

Sep. 25, 2007 (CN) .......................... 2007 1 0154688

(51) Int. Cl.
*H04J 3/06* (2006.01)
*H04L 12/403* (2006.01)
*H04L 12/40* (2006.01)
*H04J 3/08* (2006.01)

(52) U.S. Cl.
CPC .............. *H04J 3/0641* (2013.01); *H04L 12/403* (2013.01); *H04L 12/40006* (2013.01); *H04J 3/085* (2013.01)
USPC .............................. 370/254; 370/503; 370/509

(58) Field of Classification Search
CPC .. H04J 3/0641; H04J 3/085; H04L 12/40006; H04L 12/403; H04L 17/12; G06F 1/12; G06F 5/06

USPC ......... 370/217, 324, 350, 498, 503, 509, 510, 370/511, 512, 513, 514, 515, 520

See application file for complete search history.

(56) References Cited

U.S. PATENT DOCUMENTS

| | | | |
|---|---|---|---|
| 7,170,856 B1 * | 1/2007 | Ho et al. ....................... | 370/230 |
| 7,376,156 B2 * | 5/2008 | Repko et al. .................. | 370/503 |

(Continued)

FOREIGN PATENT DOCUMENTS

| | | |
|---|---|---|
| CN | 1639669 A | 7/2005 |
| CN | 1870490 A | 11/2006 |

(Continued)

OTHER PUBLICATIONS

International Search Report issued in corresponding PCT Application No. PCT/CN2008/072454; mailed Jan. 8, 2009.

(Continued)

*Primary Examiner* — Brian O'Connor
(74) *Attorney, Agent, or Firm* — Brinks Gilson & Lione (57) ABSTRACT

A method and an apparatus for tracking a clock source are disclosed. The method includes determining a best clock source to be tracked by a device according to a best clock source tracked by a slave candidate port in the device and distributing the best clock source tracked by the device through a master candidate port in a master state. Through the embodiments of the present disclosure, the clock source selection of the device converges quickly. Moreover, because the slave candidate port is determined according to the network planning, the planning of the transport network is observed.

8 Claims, 7 Drawing Sheets

(56) References Cited

U.S. PATENT DOCUMENTS

| | | | | |
|---|---|---|---|---|
| 7,397,823 | B2* | 7/2008 | Engel | 370/503 |
| 7,447,931 | B1* | 11/2008 | Rischar et al. | 713/400 |
| 7,561,598 | B2* | 7/2009 | Stratton et al. | 370/507 |
| 7,567,629 | B2* | 7/2009 | Fredriksson | 375/326 |
| 7,573,914 | B2* | 8/2009 | Ilnicki et al. | 370/519 |
| 7,649,912 | B2* | 1/2010 | Balasubramanian et al. | 370/509 |
| 7,672,227 | B2* | 3/2010 | Santoso et al. | 370/217 |
| 7,730,230 | B1* | 6/2010 | Kondapalli | 710/15 |
| 7,835,402 | B2* | 11/2010 | Erich et al. | 370/503 |
| 7,848,362 | B2* | 12/2010 | Picard | 370/509 |
| 7,924,885 | B2* | 4/2011 | De-Leon et al. | 370/503 |
| 8,098,577 | B2* | 1/2012 | De Vos et al. | 370/230 |
| 8,166,216 | B1* | 4/2012 | Kondapalli | 710/58 |
| 8,259,749 | B2* | 9/2012 | Li et al. | 370/464 |
| 8,503,458 | B1* | 8/2013 | Modi et al. | 370/395.53 |
| 2003/0093703 | A1 | 5/2003 | Oliver et al. | |
| 2005/0071703 | A1* | 3/2005 | Lee et al. | 713/400 |
| 2006/0012476 | A1* | 1/2006 | Markhovsky et al. | 340/539.32 |
| 2008/0117938 | A1* | 5/2008 | Erich et al. | 370/503 |
| 2008/0186999 | A1* | 8/2008 | De-Leon et al. | 370/465 |

FOREIGN PATENT DOCUMENTS

| | | |
|---|---|---|
| EP | 0 991 216 A2 | 4/2000 |
| GB | 2 362 060 A | 11/2001 |
| KR | 10-2007-0046644 | 5/2007 |
| WO | WO 00/31925 A1 | 6/2000 |
| WO | WO 03/041284 A2 | 5/2003 |

OTHER PUBLICATIONS

Extended European Search Report issued in corresponding European Patent Application No. 08800943.6, mailed Nov. 26, 2010.

Written Opinion of the International Searching Authority issued in corresponding PCT Patent Application No. PCT/CN2008/072454, mailed Jan. 8, 2009.

"Precision Clock Synchronization Protocol for Networked Measurement and Control Systems", International Standard, IEEE 1588, First Edition Sep. 2004.

"Draft Standard for a Precision Clock Synchronization Protocol for Networked Measurement and Control Systems", IEEE P1588, D2.1, 2007.

Office Action issued in corresponding European Patent Application No. 08800943.6, mailed Jun. 10, 2011.

* cited by examiner

METHOD AND APPARATUS FOR TRACKING CLOCK SOURCES

CROSS-REFERENCE TO RELATED APPLICATIONS

This application is a continuation of International Application No. PCT/CN2008/072454, filed on Sep. 23, 2008, which claims priority to Chinese Patent Application No. 200710154688.9, filed on Sep. 25, 2007, both of which are hereby incorporated by reference in their entireties.

FIELD OF THE DISCLOSURE

The present disclosure relates to the communication field, and in particular, to a technology for tracking clock sources.

BACKGROUND

The packet switched transport network is widely applied in the telecom transport network. A packet switched network is based on packet exchanging. The packet transport device on the network is asynchronous, but network applications impose requirements on clock synchronization and precise time synchronization. For example, the $3^{rd}$ Generation (3 G) transport network needs to transmit information of precise time and clocks. The Institute of Electrical and Electronics Engineers (IEEE) 1588 Standard provides a basis for clock synchronization and time synchronization of the packet switched network.

In the existing IEEE 1588 Standard, the Best Master Clock (BMC) selection method includes using the BMC clock source comparison algorithm to select the source, using the BMC port state determining algorithm to select the source, and using the BMC port state machine to select the source.

The BMC source selection method involves the following aspects described below.

Each port of the device receives different announce packets, and the BMC clock source comparison algorithm is run according to the clock source information (including the clock source quality level, serial number of the clock source, and topology structure of network transmission) carried in the announce packet to select the best clock source for each port (Erbest).

The device runs the BMC clock source comparison algorithm again according to the Erbest of each port and selects the best clock source for the whole device (Ebest).

The device runs the BMC port state determining algorithm according to the local clock (D0), the best clock source (Erbest) for each port, and the best clock source (Ebest) for the whole device, and determines the type of each port: BMC_slave (clock source port), BMC_master (port for distributing clocks), or BMC_passive (port neither for distributing nor for tracking clocks).

Each port runs the BMC port state machine and determines the state of the port according to the current state of the port and the BMC event. The states of the port include initializing, listening, faulty, disabled, pre_master, master, uncalibrated, slave, and passive states.

After the port in the master state receives a "slave" message, the state changes to "uncalibrated", and the time count begins. After the time count reaches the set time; the state changes to "slave". After the port in the "slave" state receives a "master" message, the state changes to "pre_master", and the time count begins. After the time count reaches the set time, the state changes to "master."

Figure 1:
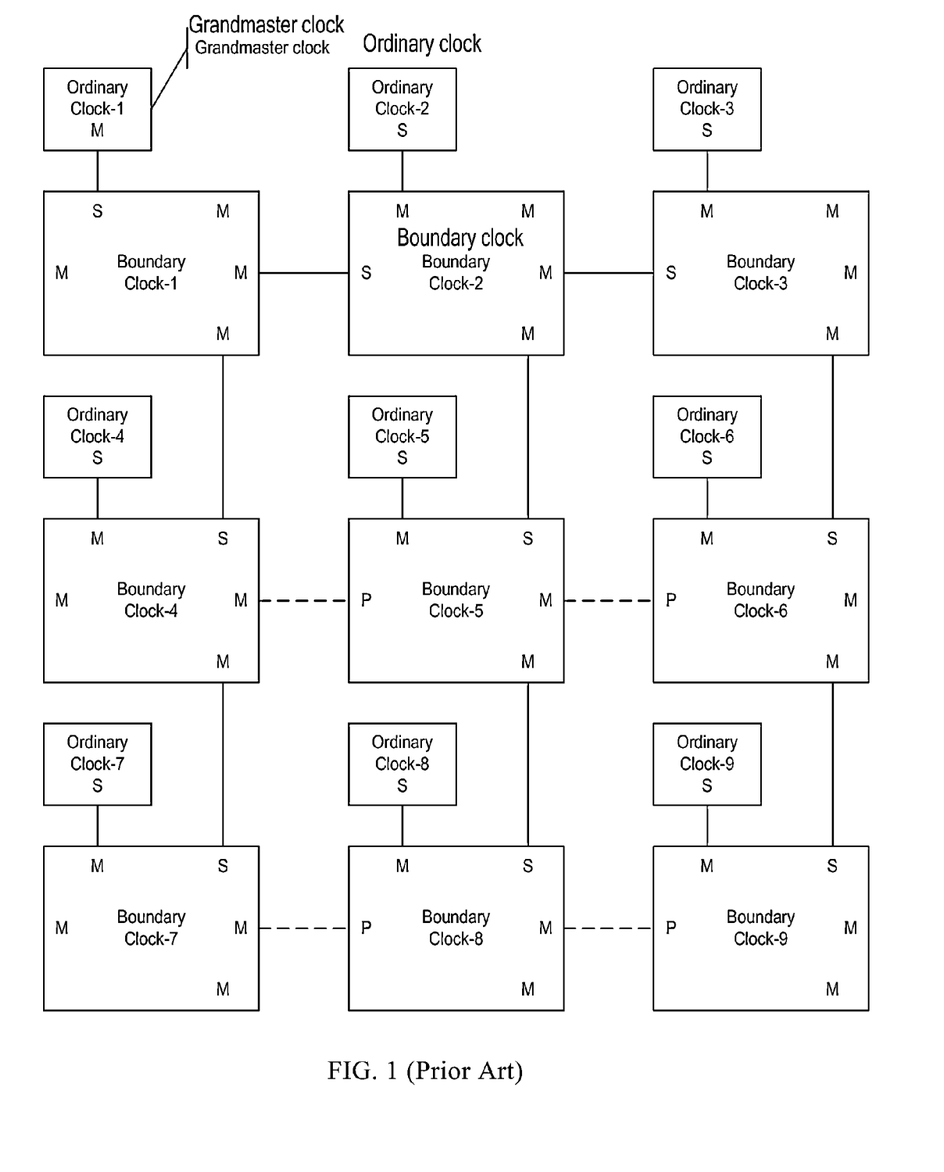
FIG. 1 shows IEEE 1588 clock networking in the prior art.

After the foregoing BMC source selection method is applied, the IEEE 1588 clock network as shown in FIG. 1 is formed. It can be seen that, the whole clock network is of a tree structure. Each Boundary Clock (BC) ultimately succeeds in tracking the grandmaster clock.

In actual applications of the transport network, typically the maximum number of boards connectible to a network element is greater than ten, and multiple ports exist on each board. Each port has multiple (e.g., five) optional clock sources. If all the announce packets arriving at each port participate in the source selection according to the BMC algorithm, the source selection is performed based on hundreds of clock sources. Moreover, the actual networking is miscellaneous, and the corresponding clock network is rather complicated. Upon initial operation of the network and after the network changes, the clock network oscillates sharply and the convergence of clock source selection tends to be slow.

Figure 2:
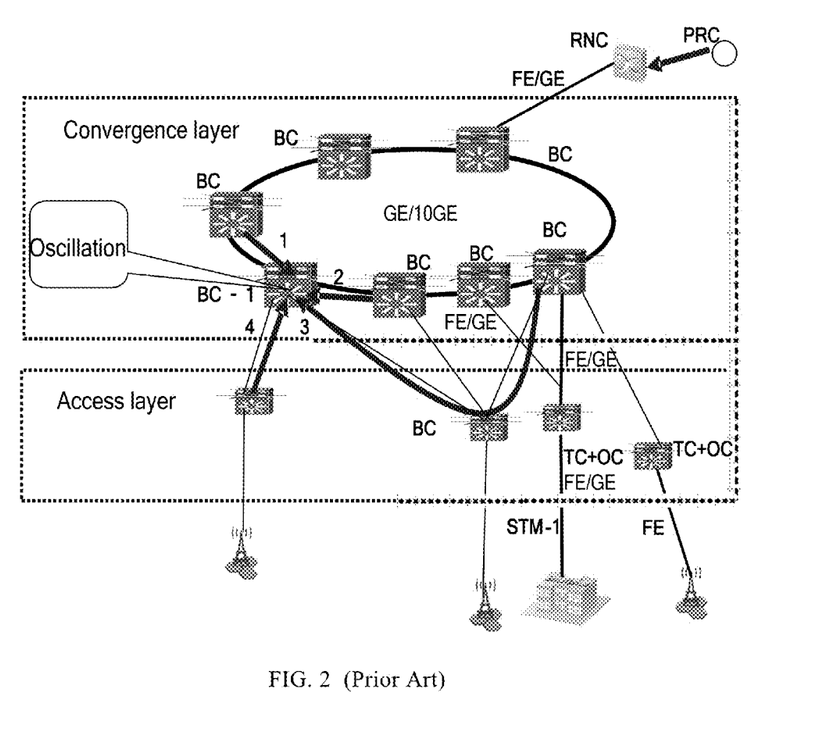
FIG. 2 shows a clock networking architecture of a transport network in the prior art.

For example, in the clock network architecture of the transport network architecture shown in FIG. 2, the convergence-layer device BC-1 has four ports: port 1, port 2, port 3, and port 4. In the source selection based on the existing BMC algorithm, the source selection process may experience the problems described below.

First, port 4 sends an access-layer clock source whose clock stratum is higher than the clock stratum of the local clock, and the device BC-1 tracks the clock source sent by port 4 according to the BMC algorithm.

Afterward, port 2 sends a clock source of a grandmaster clock of a Primary Reference Clock (PRC), and the device BC-1 switches over to the track source of port 2.

Afterward, port 3 sends the access-layer track source and introduces the grandmaster clock source of the PRC. However, the number of BC devices in the path of the track source is less than the number of BC devices in the path of the clock source introduced by port 2. According to the BMC algorithm, the device BC-1 switches over to the track source sent by port 3.

Finally, port 1 sends a track source and also introduces the grandmaster clock source of the PRC. However, the number of BC devices in the path of the track source is less than the number of BC devices in the path from the grandmaster clock source introduced by port 3 to the device BC-1. According to the BMC algorithm, the device BC-1 switches over to the track source sent by port 1.

Therefore, the track source of the device BC-1 is switched over three times: switchover from the track source of port 4 to the track source of port 2, switchover from the track source of port 2 to the track source of port 3, and switchover from the track source of port 3 to the track source of port 1. The clock oscillates sharply, and the convergence of the clock source selection is slow.

Moreover, transport networks generally include access-layer networks and convergence-layer networks. In the planning of a network, a master clock source and a slave clock source are generally configured for the convergence-layer network. Certain ports in the device are configured as follows: the port for receiving only the clock source packet from the access layer is configured as a port for distributing clocks out instead of a port for participating in the source selection, and the port for receiving the clock source packet from the convergence layer is configured as a port for participating in the source selection.

However, according to the BMC source selection method in the prior art, the packets received by all ports of the device participate in the source selection which is not consistent with the network planning. For example, in the clock networking architecture of another transport network shown in FIG. 3 according to the planning, a master clock source and a slave clock source are configured for the convergence-layer network. Therefore, only two ports need to be configured for the device BC-1 in the convergence-layer network to participate in the source selection. However, if the BMC source selection method is applied, the packets received by all ports of the device BC-1 participate in the source selection, for example, two types of packets received by port 1 and port 2 from the convergence layer, and eight types of packets received by port 3 and port 4 from the access layer. That is, the device BC-1 needs to select a source according to ten types of packets, which is not consistent with the network planning and tends to cause slow convergence of the clock source selection and result in a waste of resources. Another consequence is that the convergence-layer device tends to track the clock of the access-layer device which is not consistent with the network planning.

SUMMARY

The embodiments of the present disclosure provide a method and an apparatus for tracking a clock source so that the clock source selection of the device converges quickly.

A method for tracking a clock source in an embodiment of the present disclosure includes determining a best clock source that needs to be tracked by a device according to a best clock source tracked by a slave candidate port in the device and distributing the best clock source tracked by the device through a master candidate port in a master state of operation.

An apparatus for tracking a clock source in an embodiment of the present disclosure includes a clock source selecting unit configured to determine a best clock source that needs to be tracked by a device according to a best clock source tracked by a slave candidate port in the device and a transmitting unit configured to distribute the best clock source tracked by the device through a master candidate port in a master state.

In the technical solution under the present disclosure, the best clock source that needs to be tracked by the device is determined according to the clock source tracked by the slave candidate port in the device, and therefore, the clock source selection of the device converges quickly.

DETAILED DESCRIPTION OF THE EMBODIMENTS

The first embodiment of the present disclosure provides a method for tracking a clock source. In this method, the ports of all boards on the device are categorized into slave candidate ports and master candidate ports, and the clock source is selected according to only the clock source carried in the announce packet received by the slave candidate port to obtain the best track source of the device.

Before the first embodiment of the present disclosure is implemented, the ports of the device are categorized into slave candidate ports and master candidate ports according to the clock network planning.

Given below are examples of the clock network planning as a basis for determining the port type in the transport network:

(1) Planning for the clock network topology of the transport network.

For example, for transport networks which generally include convergence-layer networks and access-layer networks, the planning of the clock network topology of a transport network expects the device in the access-layer network to track the clock source of the device in the convergence-layer network. Therefore, at a time of determining the type of the port, the port capable of only receiving the clock source information from the access-layer device is sorted as a master candidate port for distributing clocks. The port capable of receiving the clock source information from the convergence-layer device is sorted as a slave candidate port for participating in clock source selection or is sorted as a master candidate port for distributing clocks.

(2) Planning of the master clock source and the slave clock source in the convergence-layer network.

For example, for a transport network, a master clock source, and a slave clock source are sometimes planned in the convergence-layer network. Normally, the master clock source works to transmit packets between the devices in the transport network. When the master clock source fails, the slave clock source works to transmit packets between the devices in the transport network. Therefore, in this planning, the categorization of the ports needs to consider not only the port capable of receiving master clock source, but also the port capable of receiving the slave clock source. In this embodiment, the ports capable of receiving the master clock source or the ports capable of receiving the slave clock source are sorted as slave candidate ports for participating in the clock source selection, and also are sorted as master candidate ports for distributing clocks.

Table 1 gives an instance of categorizing ports.

TABLE 1

| Slave candidate port | Master candidate port |
| --- | --- |
| Port 1 | Port 2 |
| Port 2 | Port 3 |
|  | Port 4 |
|  | Port 5 |

Figure 4:
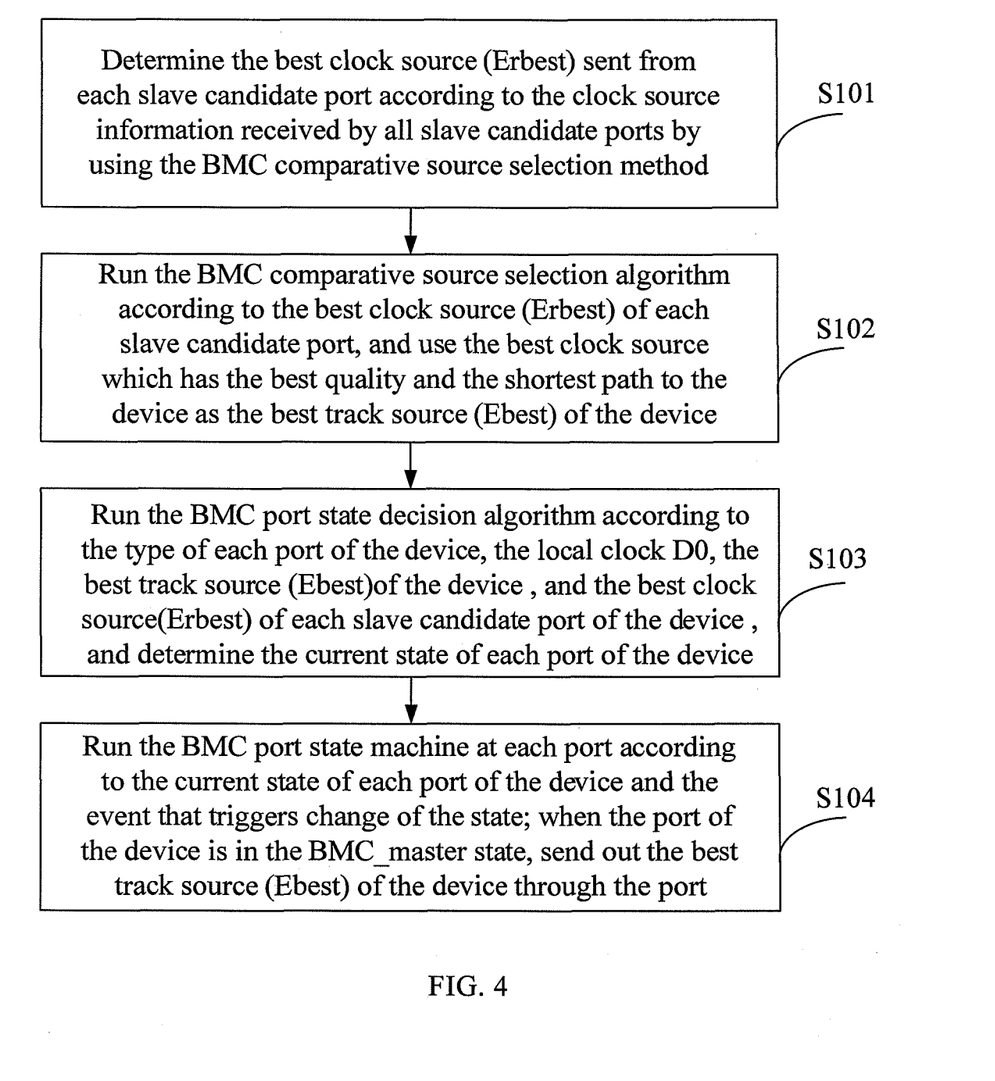
FIG. 4 is a flowchart of a first embodiment of the present disclosure.

As shown in FIG. 4, the process of implementing the first embodiment of the present disclosure includes the following steps:

Step S101: Determine the best clock source (Erbest) sent from each slave candidate port according to the clock source information carried in the announce packets received by all slave candidate ports by using the BMC comparative source selection method.

Step S102: Run the BMC comparative source selection algorithm according to the best clock source (Erbest) of each slave candidate port and use the best clock source (Erbest) characterized by the best quality and the shortest path to the device as the best track source (Ebest) of the device.

In step S102, the selection of the best track source of the device is based on the best clock source (Erbest) of the slave candidate port only and is no longer based on the best clock source (Erbest) of the master candidate port. Therefore, fewer ports participate in selecting the best track source (Ebest), and the clock source selection of the device converges quickly.

Afterward, the best clock source (Ebest) selected for the device is distributed through the master candidate port in a BMC_master state as detailed below.

Step S103: Run the BMC port state determining algorithm according to the type of each port of the device, the local clock D0, the best track source (Ebest) of the device, and the best clock source (Erbest) of each slave candidate port of the device and determine the current state of each port of the device as either a BMC_slave, a BMC_master, or a BMC_passive state.

A judgment is made about whether the stratum of the local clock (D0) of the device falls within 1-127. If the stratum of the local clock (D0) of the device falls within 1-127, the local clock (D0) needs to be distributed, and a further comparison needs to be made between the local clock (D0) and the best clock source (Erbest) of each port of the device.

1. If the quality level of the local clock (D0) of the device is higher than the quality level of the best clock source (Erbest) of the port and the port is sorted as a master candidate port (or as a master candidate port and a slave candidate port concurrently), the state of the port is determined as (i.e., to be) BMC_master.

2. If the quality level of the local clock (D0) of the device is higher than the quality level of the best clock source (Erbest) of the port, but the port is sorted as only a slave candidate port, the state of the port is determined as (i.e., to be) BMC_passive.

3. If the quality level of the local clock (D0) of the device is lower than the quality level of the best clock source (Erbest) of the port, the state of the port is determined to be the BMC_passive.

If the quality level of the local clock (D0) of the device falls outside 1-127, a comparison is made between the quality level of the local clock (D0) and the quality level of the best track source (Ebest) of the device:

1. If the quality level of the best track source (Ebest) of the device is higher than the quality level of the local clock (D0), the port of the best track source (Ebest) of the device is determined to be a BMC_slave port.

For other ports in the device:

If the port is sorted as a master candidate port (or as a master candidate port and a slave candidate port concurrently), and the quality level of the best track source of the port (Erbest) is lower than the quality level of the best track source of the device (Ebest), the state of the port is determined to be BMC_master. If the port is sorted as a master candidate port (or as a master candidate port and a slave candidate port concurrently), and the quality level of the best clock source (Erbest) of the port is equal to the quality level of the best track source (Ebest) of the device but the network topology of the best clock source (Erbest) of the port is worse than the network topology of the BMC clock source (Ebest) of the device, the state of the port is determined to be BMC_passive. If the port is sorted as a slave candidate port, the state of the port is determined to be BMC_passive.

2. If the quality level of the local clock (D0) of the device is higher than the quality level of the best track source (Ebest) of the device, the port needs to distribute the local clock (D0) to other devices. In this case, the state of each port of the device is determined according to the type of the port.

If the device port is sorted as a master candidate port (or as a master candidate port and a slave candidate port concurrently), and the quality level of the best clock source (Erbest) of the port is lower than the quality level of the local clock (D0), the state of the port is determined to be BMC_master. If the device port is sorted as a master candidate port (or as a master candidate port and a slave candidate port concurrently), and the quality level of the best clock source (Erbest) of the port is equal to the quality level of the local clock (D0) of the device but the network topology of the best clock source (Erbest) of the port is worse than the network topology of the local clock (D0) of the device, the state of the port is determined to be BMC_passive. If the device port is sorted as a slave candidate port, the state of the port is determined to be BMC_passive.

Step S104: Run the BMC port state machine at each port according to the current state of each port of the device and the event that triggers change of the state. When the port of the device is in the BMC_master state, send out the selected best track source (Ebest) of the device through the port.

In the process of running the BMC port state machine, after the port in the BMC_master state receives a "passive" message and/or a "slave" message, the state changes to "uncalibrated", and the time count begins. When the time count reaches the set time, the state changes from "uncalibrated" to "slave". After the port in the BMC_slave state receives a "master" message and/or a "passive" message, the state changes to "pre_master", and the time count begins. When the time count reaches the set time, the state changes from "pre_master" to "master."

In the BMC_slave state, the port receives and handles Sync packets and delay-resp packets, sends delay-req packets, and recovers the clock and the time according to the contents carried in the Sync packets, the delay-resp packets, and the delay-req packets.

In the BMC_master state, the port sends the Sync packet and the delay-resp packet which carry the selected best track source (Ebest) of the device, receives and processes the delay-req packet, and distributes the announce packet.

Figure 5:
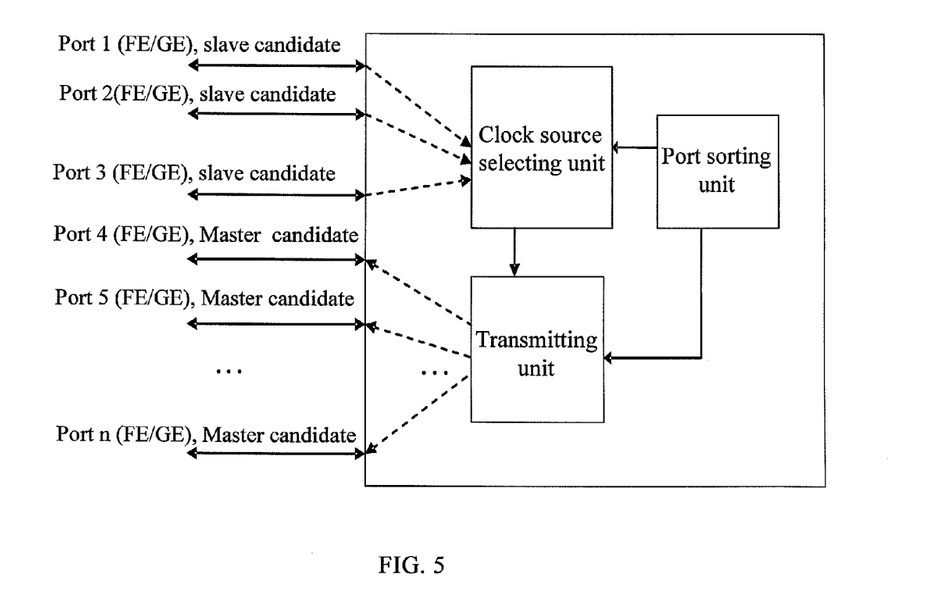
FIG. 5 shows a structure of a second embodiment of the present disclosure.

The second embodiment of the present disclosure provides an apparatus for tracking a clock source. As shown in FIG. 5, the apparatus includes a port sorting unit, a clock source selecting unit, and a transmitting unit.

The port sorting unit is configured to sort each port of the device as a slave candidate port or a master candidate port according to the clock network planning (i.e., including the clock network topology planning of the transport network and the master and slave clock source planning). That is, the port sorting unit determines the slave candidate port of the slave candidate type and the master candidate port of the master candidate type in the device according to the network planning.

The port sorting unit may further include a first port sorting sub-unit which is configured to determine the port capable of receiving the clock source information from the convergence-layer device as a slave candidate port and determine the port capable of receiving the clock source information from the access-layer device as a master candidate port according to the planning of the clock network topology of the transport network. When the first port sorting sub-unit determines the port capable of receiving the clock source information from the convergence-layer device as a slave candidate port according to the planning of the clock network topology of the transport network, the first port sorting sub-unit determines the port capable of receiving the master clock source or the slave clock source as a slave candidate port in the device according to the planning of the master and slave clock sources in the convergence-layer network. The detailed processing is the same as that described in the first embodiment above, and therefore is not described in detail here.

The port sorting unit may further include a second port sorting sub-unit which is configured to determine the port capable of receiving the clock source information from the convergence-layer device as a master candidate port according to the planning of the clock network topology of the transport network. The second port sorting sub-unit further determines the port capable of receiving the master clock source or the slave clock source as the master candidate port in the device according to the planning of the master and slave clock sources in the network. The detailed processing is the same as that described in the first embodiment above, and therefore is not described in detail here.

The clock source selecting unit uses the BMC comparative source selection method to determine the best clock source (Erbest) sent from each slave candidate port determined by the port sorting unit according to the clock source information received by all slave candidate ports, runs the BMC comparative source selection algorithm according to the best clock source (Erbest) of each slave candidate port, and determines the best clock source (Erbest) which has the best quality and the shortest path to the device to be the best track source (Ebest) of the device. The detailed processing is the same as that described in the first embodiment above, and there is not described in detail here.

The transmitting unit is configured to run the BMC port state determining algorithm according to the type of each port of the device, the local clock (D0) of the device, the best track source (Ebest) of the device, and the best clock source (Erbest) of each slave candidate port, to determine the current state of each port of the device, to run the BMC port state machine at each port according to the current state of each port and the event that triggers change of the state, and to send the selected best track source (Ebest) of the device through the port of the device when the port is in the BMC_master state. The detailed processing is the same as that described in the first embodiment above, and therefore is not described in detail here.

The second embodiment of the present disclosure may, alternatively, not include the port sorting unit. In this case, the port type information of the network device needs to be configured in the second embodiment of the present disclosure.

The second embodiment of the present disclosure may be integrated in the network device.

Through implementation of the foregoing embodiments, the clock oscillation is improved, and the convergence speed of the clock source selection is increased. Such effects are described below, taking the transport network in FIG. 2 as an example.

According to the network planning requirements, in the clock networking architecture of the transport network shown in FIG. 2, the convergence-layer device never tracks the clock sent by the access-layer device. In this case, the convergence-layer device BC-1 needs only to track the clock sent by port 1 and port 2. Therefore, in this embodiment, the four ports of the convergence-layer device BC-1 are configured according to Table 2.

TABLE 2

| Slave candidate port | Master candidate port |
|---|---|
| Port 1 | Port 1 |
| Port 2 | Port 2 |
|  | Port 3 |
|  | Port 4 |

Afterward, the best clock source of the device BC-1 is selected in light of the packet received by the slave candidate port. The switchover of the clock source is as follows:

First, the device BC-1 tracks the clock source of port 2 and then tracks the clock source of port 1.

Therefore, after the foregoing embodiment is applied, the clock source switches over only one time. The clock oscillation is reduced, and the convergence speed of the clock source selection is increased.

The implementation of the foregoing embodiment is consistent with the clock network planning. Such an effect is described below, taking the clock networking architecture of the transport network in FIG. 3 and FIG. 6 as examples.

Figure 3:
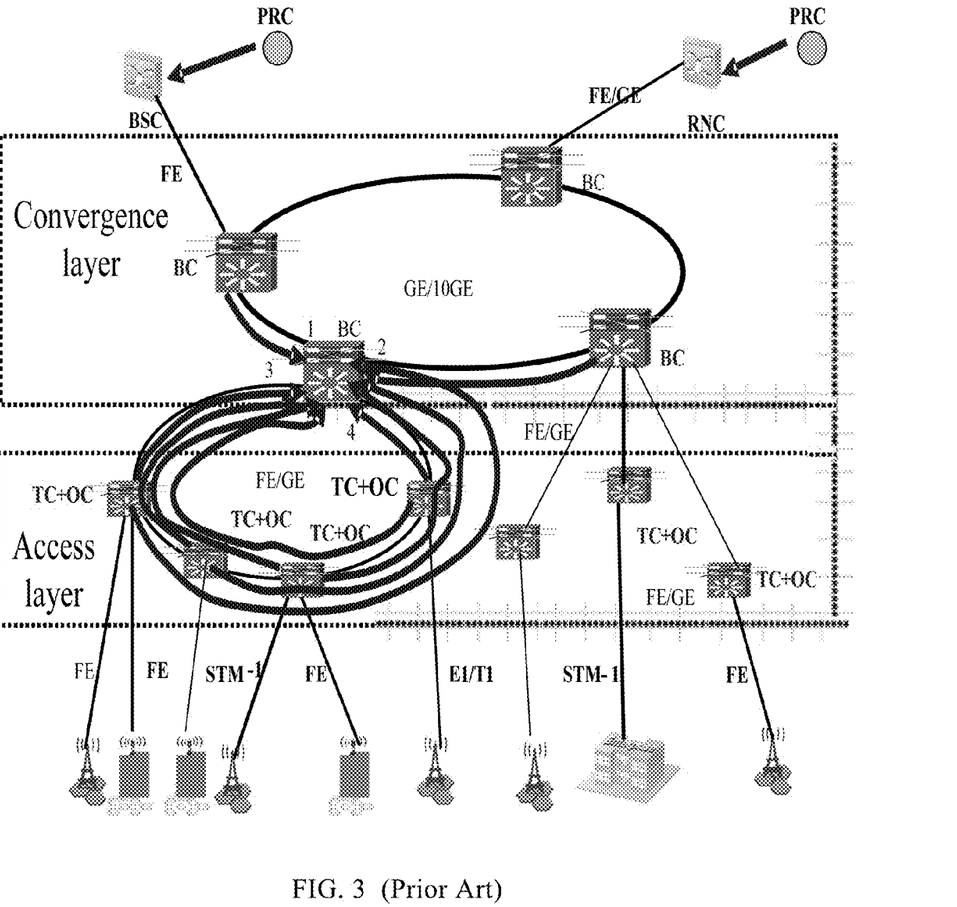
FIG. 3 shows a clock networking architecture of another transport network in the prior art.

For the clock networking architecture of the transport network shown in FIG. 3, the convergence-layer device never tracks the clock sent by the access-layer device according to the network planning requirements. In this case, the convergence-layer device BC-1 needs only to track the clock from port 1 and port 2. In this embodiment, therefore, port 1 and port 2 are configured as slave candidate ports, and port 2, port 3, and port 4 are configured as master candidate ports, as shown in Table 3:

TABLE 3

| Slave candidate port | Master candidate port |
|---|---|
| Port 1 | Port 2 |
| Port 2 | Port 3 |
|  | Port 4 |

Figure 7:
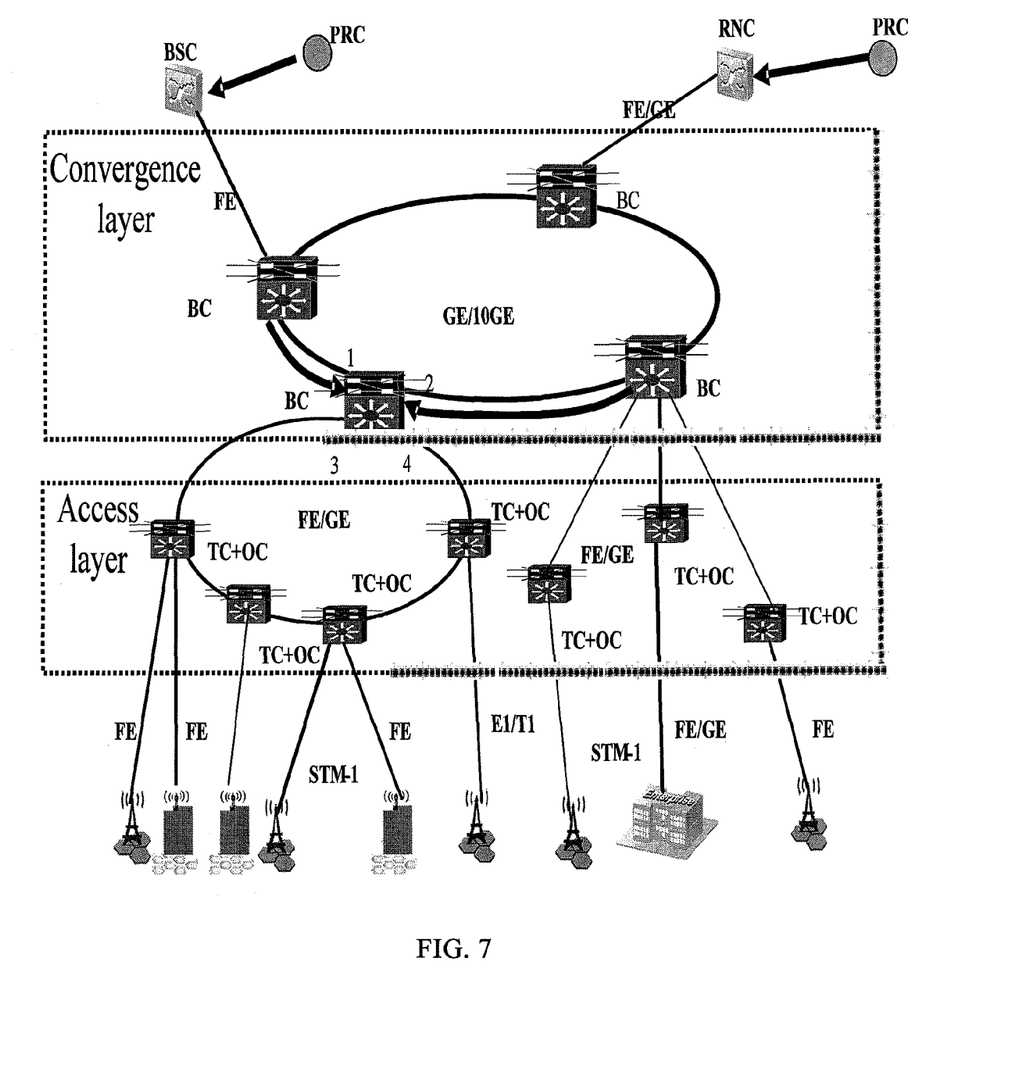
FIG. 7 shows another clock networking architecture obtained through an embodiment of the present disclosure.

In this way, the device selects the clock source in light of only the packets sent by port 1 and port 2 (see the curve with arrows in FIG. 7) instead of the packets sent by port 3 or by port 4. Therefore, the implementation is consistent with the transport network planning.

Figure 6:
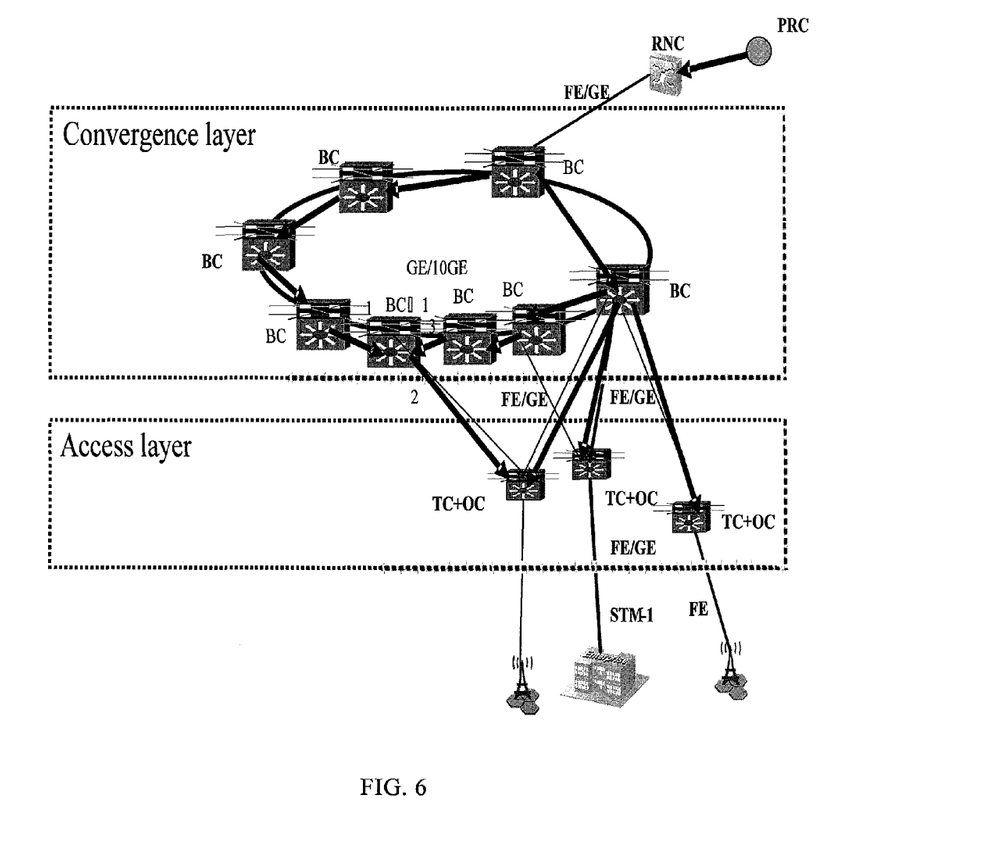
FIG. 6 shows a clock networking architecture obtained through an embodiment of the present disclosure.

Taking the clock networking architecture of the transport network in FIG. 6 as an example, the convergence-layer device never tracks the clock sent by the access-layer device according to the network planning requirements. In this case, the convergence-layer device BC-1 needs only to track the clock sent by port 1 and port 3. In this embodiment, therefore, port 1 and port 3 are configured as slave candidate ports, and port 1, port 2, and port 3 are configured as master candidate ports, as shown in Table 4:

TABLE 4

| Slave candidate port | Master candidate port |
|---|---|
| Port 1 | Port 1 |
| Port 3 | Port 2 |
|  | Port 3 |

In this way, the device selects the clock source in based only on the packets sent by port 1 and port 3, which is consistent with the transport network planning.

As revealed in the technical solution above, the best clock source of the device is selected based on the packets received by the slave candidate port. In this way, fewer ports are involved in the source selection calculation and fewer clock sources are involved in the selection. For example, if a device has ten boards where each board has ten ports, and where each port allows at most five candidate sources, 500 clock sources are involved in the selection according to the processing method in the prior art. In contrast, if an embodiment under the present disclosure is applied, a port of a board may be configured as a slave candidate port, and a maximum of five clock sources are involved in the selection which reduces the computation load to $1/100$. Therefore, the oscillation time is reduced in the clock source selection process, and the convergence speed of the clock source is increased. As a result, the bandwidth occupied by the distributed packets is reduced.

In the embodiments of the present disclosure, the slave candidate port involved in the source selection is determined according to the network planning. Therefore, the convergence-layer device is prevented from tracking the clock source sent by the access-layer device. When the master clock source fails, the convergence-layer device can track the slave clock source, and the clock planning requirements are strictly observed in the transport network that requires high controllability.

After reading the foregoing embodiments, those skilled in the art will appreciate that the present disclosure may be implemented through hardware, or through software in addition to a necessary universal hardware platform. The technical solution under the present disclosure may be embodied as a software product. The software product may be stored in a non-volatile storage medium (such as CD-ROM, USB flash disk, or mobile hard disk), and may include several instructions that enable a computer device (such as personal computer, server, or network device) to perform the methods provided in the embodiments of the present disclosure.

Although the disclosure is described through some exemplary embodiments, the disclosure is not limited to such embodiments. It is apparent that those skilled in the art can make modifications and variations to the disclosure without departing from the spirit and scope of the disclosure. The disclosure is intended to cover the modifications and variations provided that they fall in the scope of protection defined by the following claims or their equivalents.

What is claimed is:

1. A method for tracking a clock source, the method comprising:
classifying each of ports of a device into a slave candidate port, a master candidate port, or a slave and master candidate port, wherein at least one of the ports of the device is only classified as a master candidate port;
for each port of the device, calculating a Erbest, wherein the Erbest is a best clock source being tracked by the port of the device;
calculating a Ebest of the device only according to Erbests of the slave candidate ports and the slave and master candidate ports;
determining a best clock source of the device according the Ebest and a D0, wherein the D0 is the local clock of the device;
for each port of the device, determining a current state of the port according to the D0, the Ebest, the Erbest of the port and the classification of the port;
distributing the best clock source through a port which is determined as in a BMC_master state.

2. The clock source tracking method of claim 1, wherein the classifying each of ports of a device
comprises classifying a port being capable of only receiving clock source information from any one device in an access-layer as the master candidate port according to planning of a clock network topology of a transport network.

3. The clock source tracking method of claim 1, wherein a port only classified as slave candidate port cannot be in the BMC_master state.

4. The clock source tracking method of claim 1, wherein a port only classified as master candidate port cannot be in the BMC_slave state.

5. An apparatus for tracking a clock source, the apparatus comprising:
a port sorting unit, configured to:
classify each of ports of a device into a slave candidate port, a master candidate port, or a slave and master candidate port, wherein at least one of the ports of the device is only classified as a master candidate port;
a clock source selecting unit, configured to:
for each port of the device, calculate a Erbest, wherein the Erbest is a best clock source being tracked by the port of the device; calculate a Ebest of the device only according to Erbests of the slave candidate ports and the slave and master candidate ports; determine a best clock source of the device according the Ebest and a D0, wherein the D0 is the local clock of the device;
a transmitting unit, configured to:
for each port of the device, determine a current state of the port according to the D0, the Ebest, the Erbest of the port and the classification of the port; distribute the best clock source through a port which is determined as in a BMC_master state.

6. The clock source tracking apparatus of claim 5 wherein the port sorting unit comprises:
a first port sorting sub-unit configured to classify a port being capable of only receiving clock source information from any one device in an access-layer as the master candidate port according to planning of a clock network topology of a transport network.

7. The clock source tracking apparatus of claim 5, wherein a port only classified as slave candidate port cannot be in the BMC_master state.

8. The clock source tracking apparatus of claim 5, wherein a port only classified as master candidate port cannot be in the BMC_slave state.

* * * * *